US012492670B2

(12) United States Patent
Schroeder et al.

(10) Patent No.: US 12,492,670 B2
(45) Date of Patent: Dec. 9, 2025

(54) DUAL FUEL SYSTEM HAVING DUAL FUEL INJECTOR AND ENGINE OPERATING METHOD (71) Applicant: Caterpillar Inc., Peoria, IL (US)

(72) Inventors: Eric Lee Schroeder, Germantown Hills, IL (US); David Todd Montgomery, Edelstein, IL (US); Dana Ray Coldren, Secor, IL (US); Chad Koci, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 145 days.

(21) Appl. No.: 18/490,231

(22) Filed: Oct. 19, 2023

(65) Prior Publication Data
US 2024/0044308 A1 Feb. 8, 2024

Related U.S. Application Data (62) Division of application No. 17/831,668, filed on Jun. 3, 2022, now Pat. No. 11,815,054, which is a division
(Continued)

(51) Int. Cl.
F02M 43/04 (2006.01)
F02D 19/06 (2006.01)
(Continued)

(52) U.S. Cl.
CPC ......... *F02M 43/04* (2013.01); *F02D 19/0694* (2013.01); *F02D 19/0649* (2013.01);
(Continued)

(58) Field of Classification Search
CPC .. F02M 43/04; F02M 47/027; F02M 2200/46; F02D 19/0694; F02D 19/0649; F02D 19/10
See application file for complete search history.

(56) References Cited

U.S. PATENT DOCUMENTS 4,416,229 A 11/1983 Wood
4,864,990 A 9/1989 Tateishi
(Continued)

FOREIGN PATENT DOCUMENTS

EP 3330526 B1 7/2019
EP 3009628 B1 7/2020
(Continued)

OTHER PUBLICATIONS

Ryan et al., Dual Fuel Injection Nozzle of Methanol Fueled Compression Ignition Engine Operation, Oct. 7-10, 1991, International Fuels and Lubricants Meeting and Exposition, The Engineering Society for Advancing Mobility Land Sea Air and Space, SAE International, Toronto, Canada.
(Continued)

*Primary Examiner* — George C Jin
(74) *Attorney, Agent, or Firm* — Brannon Sowers & Cracraft PC (57) ABSTRACT A dual fuel system for an internal combustion engine includes a first fuel supply of a liquid pilot fuel, a primary fuel supply of a liquid primary fuel, and a dual fuel injector. The dual fuel injector includes a spill valve fluidly connected with a plunger cavity and movable to control a start of injection and an end of injection, and an admission valve. The admission valve is movable to admit a pilot fuel into the fuel injector, such that the pilot fuel is conveyed through an outlet check to form, within a primary fuel passage fluidly connected to the plunger cavity, a segmented fuel charge of leading pilot fuel and trailing primary fuel by displacing some of the primary fuel. The liquid pilot fuel may be a higher cetane/lower octane liquid fuel, and the primary fuel may be a lower cetane/higher octane liquid fuel.

10 Claims, 4 Drawing Sheets

Related U.S. Application Data of application No. 17/167,211, filed on Feb. 4, 2021, now Pat. No. 11,384,721.

(51) Int. Cl.
  *F02D 19/10* (2006.01)
  *F02M 47/02* (2006.01)

(52) U.S. Cl.
  CPC .......... *F02D 19/10* (2013.01); *F02M 47/027* (2013.01); *F02M 2200/46* (2013.01)

(56) References Cited

U.S. PATENT DOCUMENTS

| | | |
|---|---|---|
| 5,163,397 A | 11/1992 | Pien |
| 5,996,558 A | 12/1999 | Ouellette |
| 6,336,598 B1 | 1/2002 | Touchette |
| 6,484,699 B2 | 11/2002 | Paul |
| 7,668,640 B2 | 2/2010 | Teraji |
| 12,326,127 B2 * | 6/2025 | Coldren ............... F02D 19/081 |
| 2002/0070295 A1 | 6/2002 | Baker |
| 2002/0078918 A1 | 6/2002 | Ancimer |
| 2009/0150050 A1 | 6/2009 | Mashida |
| 2010/0199948 A1 | 8/2010 | Rogak |
| 2013/0081593 A1 | 4/2013 | Coldren |
| 2013/0160741 A1 | 6/2013 | Sommars |
| 2017/0130685 A1 * | 5/2017 | Kalenborn ............ F02M 61/14 |
| 2018/0347500 A1 | 12/2018 | Nooijen |
| 2019/0032618 A1 | 1/2019 | Soleri |
| 2020/0386171 A1 | 12/2020 | Coldren |

FOREIGN PATENT DOCUMENTS

| | | |
|---|---|---|
| JP | S61145329 B2 | 8/1993 |
| JP | 2000249015 A | 7/2008 |

OTHER PUBLICATIONS

Written Opinion and International Search Report for Int'l. Patent Appln. No PCT/US2022/012940, dated May 3, 2022 (16 pgs).

* cited by examiner

DUAL FUEL SYSTEM HAVING DUAL FUEL INJECTOR AND ENGINE OPERATING METHOD

The present disclosure is a divisional of U.S. patent application Ser. No. 17/831,668, filed Jun. 3, 2022, which is a divisional of U.S. patent application Ser. No. 17/167,211, filed Feb. 4, 2021, now U.S. Pat. No. 11,384,721, issued Jul. 12, 2022, the contents of which are hereby incorporated by reference in their entirety.

TECHNICAL FIELD

The present disclosure relates generally to a dual fuel system, and more particularly to displacing a liquid primary fuel in a primary fuel passage in a dual fuel injector with a liquid pilot fuel to form a segmented fuel charge.

BACKGROUND

Internal combustion engines are used in virtually innumerable applications throughout the world for vehicle propulsion, electric power generation, handling of liquids and gasses, and for various industrial purposes. In a typical operating scheme, fuel and air is combusted within a combustion cylinder to produce a rapid rise in pressure and drive a piston to rotate a crankshaft. Spark-ignited engines typically employ a liquid petroleum distillate fuel, such as gasoline, or various gaseous fuels such as natural gas, methane, and still others. Compression-ignition engines conventionally utilize diesel distillate fuels, biodiesel, various blends, and still others. In recent years, combustion science research has focused to a considerable degree on engine systems and operating strategies that utilize multiple types of fuel, with a relatively easily ignitable pilot fuel used to ignite a second fuel typically in a larger volume than the pilot fuel.

One known dual fuel operating strategy employs one or more relatively small pilot shots of a diesel distillate fuel directly injected into a cylinder, and compression-ignited to ignite a larger charge of a gaseous fuel. Other strategies have attempted to use a liquid pilot fuel in combination with a liquid primary fuel. U.S. Pat. No. 4,416,229 to Wood proposes a fuel injection system having a single injector for injecting a diesel fuel and an alternative fuel into combustion chambers in an engine. The strategy apparently forms a plume having diesel fuel at its tip so that the diesel fuel is ignited by compression in the combustion chamber, and the alternative fuel is ignited by the ignition of the diesel fuel. While Wood may have certain applications, there is always room for improvement and development of alternative strategies.

SUMMARY OF THE INVENTION

In one aspect, a dual fuel system for an internal combustion engine includes a first fuel supply of a liquid pilot fuel, and a primary fuel supply of a liquid primary fuel ignitable in an engine combustion cylinder based on compression-ignition of the liquid pilot fuel. The dual fuel system further includes a dual fuel injector including an injector housing having formed therein a plurality of nozzle outlets, and defining a low pressure space. The dual fuel injector further includes an outlet check movable from a closed position blocking the nozzle outlets, to an open position, a primary fuel passage formed between the injector housing and the outlet check, and a pilot fuel passage formed in the outlet check. The dual fuel injector further includes a plunger, a plunger cavity formed in part by the plunger and fluidly connected to the primary fuel passage, a spill valve, and an admission valve. The spill valve is movable from an open position where the plunger cavity is fluidly connected to the low pressure space, to a closed position. The admission valve is movable from a closed position blocking the pilot fuel passage from the first fuel supply, to an open position to admit liquid pilot fuel to the pilot fuel passage. The outlet check further has formed therein a transfer passage fluidly connecting the pilot fuel passage to the primary fuel passage to form, within the primary fuel passage, a segmented fuel charge of leading pilot fuel and trailing primary fuel.

In another aspect, a method of operating an engine includes admitting a liquid pilot fuel into a pilot fuel passage in a fuel injector, and displacing a liquid primary fuel in a primary fuel passage in the fuel injector with liquid pilot fuel from the pilot fuel passage to form a segmented fuel charge of leading pilot fuel and trailing primary fuel in the primary fuel passage. The method further includes increasing a fluid pressure in the primary fuel passage to an injection pressure after the formation of the segmented fuel charge, and opening an outlet check in the fuel injector to inject the segmented fuel charge into a combustion cylinder in the engine. The method still further includes igniting, within the combustion cylinder, the liquid primary fuel of the segmented fuel charge based on compression-ignition of the liquid pilot fuel of the segmented fuel charge.

In still another aspect, a dual fuel injector includes an injector housing having formed therein nozzle outlets, a plunger cavity, and a pilot fuel inlet, and the injector housing defining a low pressure space. An outlet check of the dual fuel injector is movable from a closed position blocking the nozzle outlets, to an open position. A primary fuel passage is formed in the injector housing and fluidly connected to the plunger cavity, and a pilot fuel passage is formed in the outlet check. A plunger of the dual fuel injector is movable in the plunger cavity from a retracted position to an advanced position, to increase a pressure of a primary fuel in the plunger cavity to an injection pressure, and a spill valve is positioned fluidly between the plunger cavity and the low pressure space. An admission valve is positioned fluidly between the pilot fuel inlet and the pilot fuel passage, and a transfer passage fluidly connects the pilot fuel passage to the primary fuel passage.

DETAILED DESCRIPTION

Figure 1:
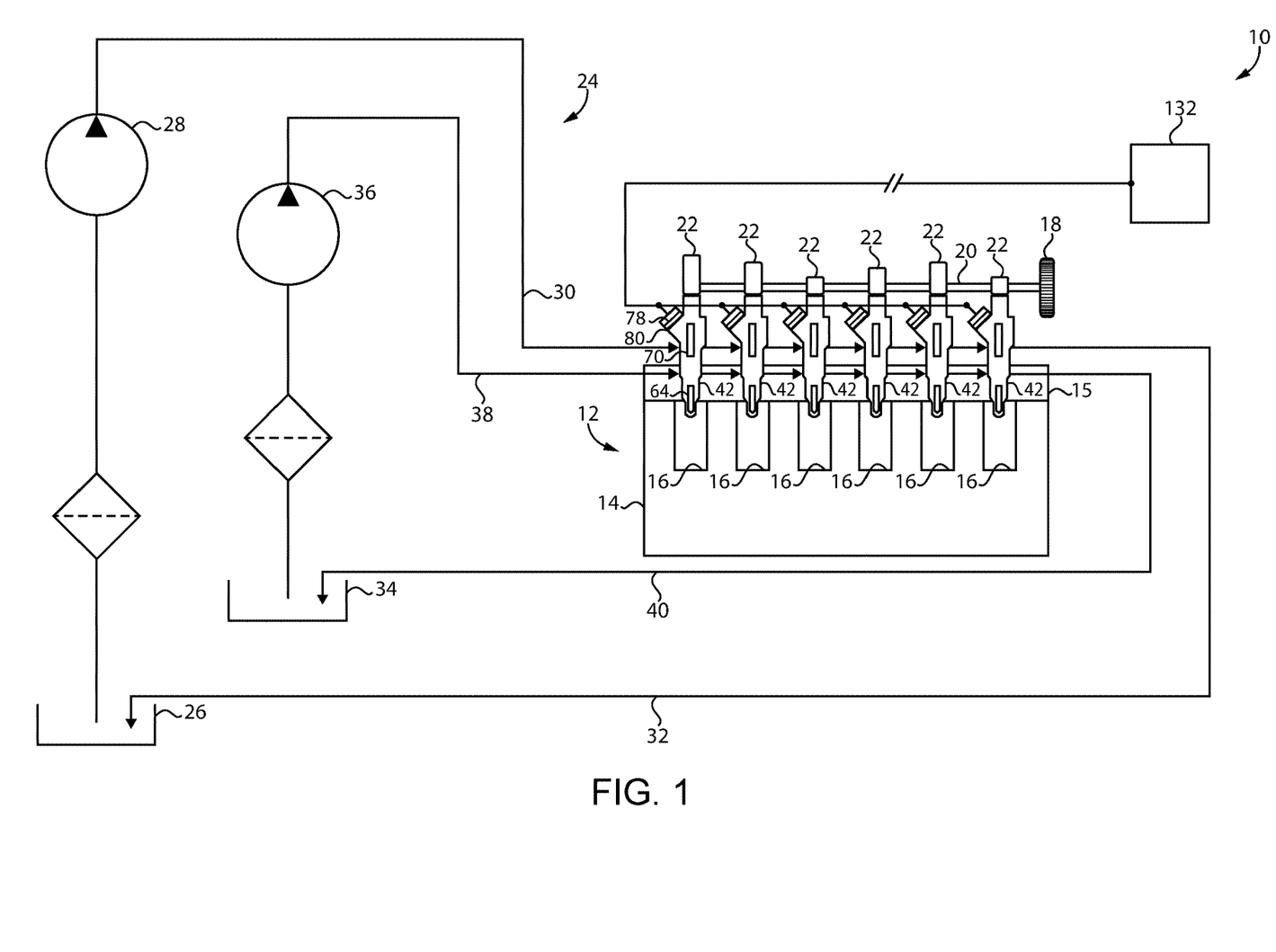
FIG. 1 is a diagrammatic view of an internal combustion engine system, according to one embodiment.

Referring to FIG. 1, there is shown a dual fuel internal combustion engine system 10, according to one embodiment. Engine system 10 includes an internal combustion engine 12 having a cylinder block 14 and an engine head 16 mounted upon cylinder block 14. A plurality of combustion cylinders 16 are formed in cylinder block 14, and can have any suitable arrangement such as a V-pattern, an inline pattern, or still another, and may have any number. It will be understood that each combustion cylinder 16 is associated with a piston movable between a top dead center position and a bottom dead center position in a generally conventional manner, typically in a four-stroke engine cycle. The pistons will be coupled with a crankshaft rotatable to provide torque for purposes of vehicle propulsion, operating a generator for production of electrical energy, or in still other applications such as operating a compressor, a pump, or various other types of equipment. Engine 12 further includes a cam gear 18, rotated in an engine gear train by way of rotation of a crankshaft, and coupled with a camshaft 20 having a plurality of cams 22 thereon.

Engine system 10 further includes a dual fuel system 24. Dual fuel system 24 may include a first fuel supply 26 of a liquid pilot fuel, a second or primary fuel supply 34 of a liquid primary fuel, and a plurality of dual fuel injectors 42. A first pump 28 conveys liquid pilot fuel from first fuel supply 26 to engine 12. A second pump 36 conveys liquid primary fuel from primary fuel supply 34 to engine 12. In the illustrated embodiment, a feed line 30 receives a feed of liquid pilot fuel from pump 28, and a feed line 38 receives a feed of liquid primary fuel from pump 36. A low pressure return line 32 may extend from engine 10 back to first fuel supply 26, and a low pressure return line 40 may extend from engine 10 back to primary fuel supply 34. It can be seen from FIG. 1 that feed line 38 extends to engine head 15. A flow of primary fuel may be conveyed from feed line 38 through engine head 15 to each of fuel injectors 42. A flow of pilot fuel may be conveyed from feed line 30 to each of fuel injectors 42, such as by way of individual fuel lines fluidly connecting between each of fuel injectors 42 in a so-called daisy chain arrangement. Fuel lines feeding the primary fuel to fuel injectors 42 may include cast-in feed lines in engine head 15 in at least certain embodiments. Each of fuel injectors 42 is positioned to extend into one of combustion cylinders 16 for direct fuel injection. Dual fuel system 24 may be advantageously applied in some instances to legacy diesel engines without any need for modifications apart from swapping out the existing fuel system. As will also be further apparent from the following description, dual fuel system 24 may be structured for producing segmented fuel charges of leading pilot fuel and trailing primary fuel each injected from a single one of fuel injectors 42 into one of combustion cylinders 16, with limited mixing of the pilot fuel and primary fuel within the respective fuel injector prior to injection.

The liquid pilot fuel may include a higher cetane/lower octane liquid fuel, and the primary fuel may include a lower cetane/higher octane liquid fuel. The terms "higher" and "lower" in this context may be understood as relative terms in relation to one another. Thus, the liquid pilot fuel may have a higher cetane number and a lower octane number than a cetane number and an octane number of the primary fuel. The liquid pilot fuel might include a diesel distillate fuel, dimethyl ether, biodiesel, vegetable oil, any of a variety of liquid fuels with a cetane enhancer, or still another fuel type. The primary fuel may include an alcohol fuel such as methanol or ethanol, for example, or still other fuel types.

In a practical implementation, the pilot fuel may be supplied to fuel injectors 42 at a relatively higher pressure, and the primary fuel may be supplied to fuel injectors 42 at a relatively lower pressure. The primary fuel may be pressurized further prior to injection, such as within each fuel injector 42 as further discussed herein. The primary fuel will typically not be readily compression-ignitable at least relative to the pilot fuel, and relies for its ignition, and typically subsequent diffusion combustion, in combustion cylinder 16 based upon the compression-ignition of the pilot fuel. In a typical application in any one fuel injection a quantity of the pilot fuel will be less than a quantity of the primary fuel, with the purpose of the pilot fuel being substantially only for ignition purposes of the primary fuel. The relative amounts of pilot fuel and primary fuel can vary depending upon engine conditions. At lower engine speeds and lower engine loads a greater quantity of pilot fuel, or greater relative quantity of pilot fuel, in a fuel charge may be used. At higher engine speeds and higher engine loads a lesser quantity, or lesser relative quantity of pilot fuel, may be used.

Figure 2:
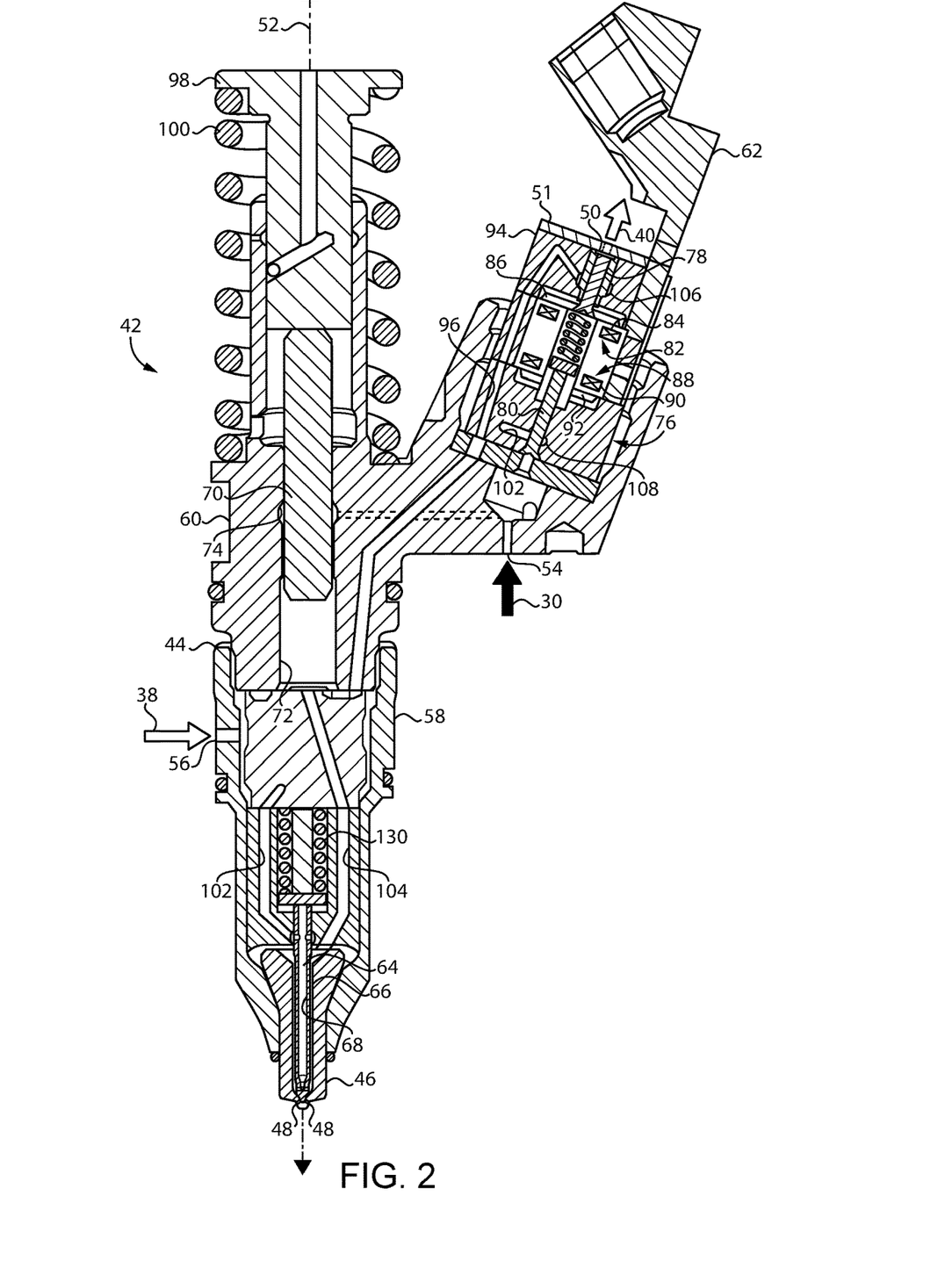
FIG. 2 is a sectioned side diagrammatic view of a dual fuel injector, according to one embodiment.
Figure 3:
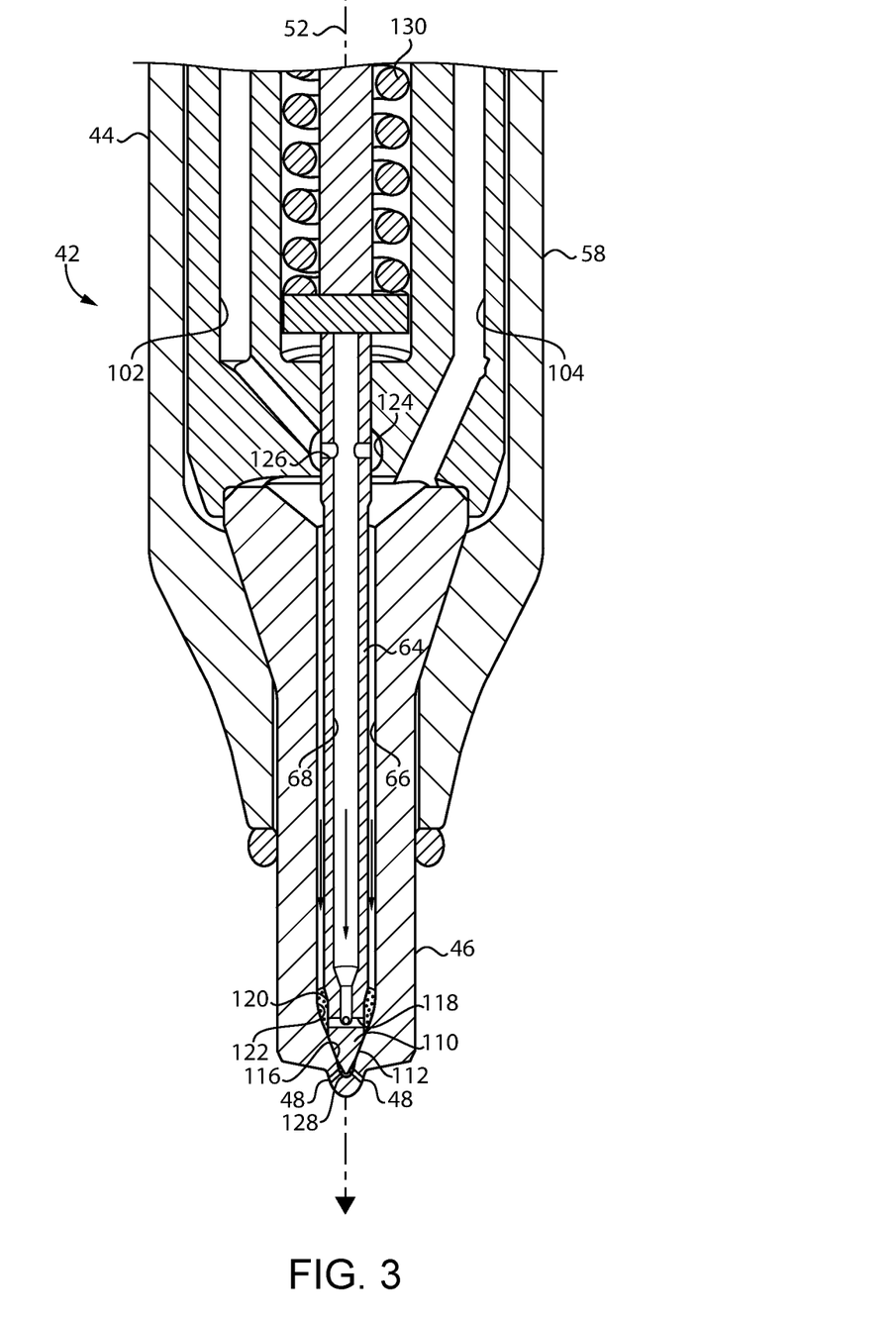
FIG. 3 is an enlarged view of a portion of the dual fuel injector of FIG. 2.

Referring also now to FIGS. 2 and 3, there are shown features of one of dual fuel injectors 42 in greater detail. Each dual fuel injector 42 (hereinafter referred to at times in the singular), includes an injector housing 44 having formed therein a plurality of nozzle outlets 48, in a nozzle tip 46. Injector housing 44 further defines a longitudinal axis 52. Injector housing 44 also has formed therein a pilot fuel inlet 54, and a primary fuel inlet 56. In the illustrated embodiment, primary fuel inlet 56 is formed in a case 58 of injector housing 44, however, fuel inlet 56 might be located elsewhere. Pilot fuel inlet 54 is formed in an injector body 60 attached to case 58, such as by way of a threaded connection, to clamp intervening components between case 58 and injector body 60. When installed for service with engine 12 case 58 may be positioned at least partially within engine head 15 in an injector bore, and injector body 60 may be at least partially outside of engine head 15 beneath a valve cover. Injector housing 44 further defines a low pressure space 50. Low pressure space 50 is shown as a low pressure outlet fluidly connected to return line 40 but could additionally or alternatively include a low pressure "space" between or among components within injector housing 44. Injector housing 44 might also include a pilot fuel outlet in some instances to drain excess pilot fuel back to tank. Moreover, in some embodiments primary fuel could be drawn into and expelled from injector housing 44 through the same inlet/outlet port in response to passive plunger action further described herein, except during injection through nozzle outlets 48.

Dual fuel injector 42 further includes an outlet check 64 movable from a closed position blocking nozzle outlets 48, to an open position at which outlet check 64 does not block nozzle outlets 48. Dual fuel injector 42 also includes a primary fuel passage 66. In the illustrated embodiment primary fuel passage 66 is formed between injector housing 44 and outlet check 64 and extends longitudinally along at least a part of an axial length of outlet check 64. A pilot fuel passage 68 is formed in outlet check 64. Dual fuel injector 42 further includes a plunger 70, and a plunger cavity 72 formed in part by plunger 70 within injector housing 44 and fluidly connected to primary fuel passage 66. Dual fuel injector 42 further includes a spill valve 78, and an admission valve 80 further discussed herein. A cap 51 may be coupled to injector housing 44 and provides a fluid connection between spill valve 78 and return line 40.

Plunger 70 may be mechanically actuated, with dual fuel injector 42 further including a tappet 98 structured to be contacted by one of cams 22 to move plunger 70 between a retracted position and an advanced position in response to camshaft rotation and in cooperation with a return spring 100. In the illustrated embodiment, plunger 70 is integrated with other components of dual fuel injector 42 within injector housing 44. In other embodiments plunger 70 could be positioned in a separate housing piece. References herein to an injector housing therefore should be understood to contemplate multiple separate housing parts or housing pieces that are fluidly connected but perhaps not otherwise physically attached. A fuel seal annulus 74 is formed in injector housing 44 and extends circumferentially around plunger 70. Fuel seal annulus 74 may be fluidly connected to pilot fuel inlet 54, and can assist in providing lubrication of plunger 70 and resistance to migration of primary fuel out of plunger cavity 72 between plunger 70 and injector body 60.

Dual fuel injector 42 further includes a valve assembly 76 of which spill valve 78 and admission valve 80 are parts. Valve assembly 76 may be supported on or at least partially within injector housing 44, and includes a first electrical actuator 82 for actuating spill valve 78 and a second electrical actuator 88 for actuating admission valve 80. Electrical actuator 82 may include a solenoid coil 84, and an armature 86 attached to spill valve 78. Electrical actuator 88 may include a solenoid coil 90, and an armature 92 attached to admission valve 80. Admission valve 80 and spill valve 78 may thus each be electrically actuated. An electrical connector 62 is part of or attached to valve assembly 76 and provides for electrical connections of solenoid coils 84 and 90 to an electronic control unit 132, as shown in FIG. 1, used to energize solenoid coils 84 and 90 selectively to actuate spill valve 78 and admission valve 80, respectively. Each of admission valve 80 and spill valve 78 may include a two-way, two-position valve. A spill valve fuel annulus 106, or other fluid passage, may be fluidly connected, at times, to both spill passage 96 and low pressure space 50. An admission valve fuel annulus 108, or other fluid passage, is fluidly connected, at times, to a passage 102 and pilot fuel inlet 54. Passage 102 fluidly connects to pilot fuel passage 68 by way of fluid connections not visible in the sectioned view of FIG. 2. As can be best seen in FIG. 3, another annulus 126 is formed in injector housing 44 and fluidly connects passage 102 to pilot fuel passage 68 by way of ports 126.

Spill valve 78 is movable from an open position where plunger cavity 72 is fluidly connected to low pressure space 50, to a closed position where plunger cavity 72 is blocked from low pressure space 50. During operating dual fuel system 24 plunger 70 can reciprocate passively in dual fuel injector 42 to draw fuel into plunger cavity 72 and push fuel out of plunger cavity 72 by way of spill valve 78 to low pressure space 50. When spill valve 78 is moved to a closed position, such as by energizing solenoid coil 84, spill valve 78 blocks plunger cavity 72 from low pressure space 50 and enables plunger 70 to increase a fluid pressure in plunger cavity 72 and primary fuel passage 66 to an injection pressure, starting injection. When spill valve 78 is subsequently opened, such as by deenergizing solenoid coil 84, plunger cavity 72 is once again fluidly connected to low pressure space 50 and fuel injection ends.

Admission valve 80 is movable from a closed position blocking pilot fuel passage 68 from pilot fuel inlet 54 and thus first fuel supply 26, to an open position to admit pilot fuel to passage 68. Admission valve 80 may be electrically actuated as discussed herein and opened and/or closed at selected timings and thus held open for a selected open time to vary a quantity of pilot fuel in a segmented fuel charge as further discussed herein. Outlet check 64 further has formed therein a transfer passage 118, typically a plurality of radially extending transfer passages 118, fluidly connecting pilot fuel passage 68 to primary fuel passage 66 to form, within primary fuel passage 66, a segmented fuel charge of leading pilot fuel and trailing primary fuel. The pilot fuel is leading as it is injected first, and the primary fuel is trailing as it is injected subsequently to the leading pilot fuel. As can be seen from FIG. 3, transfer passages 118 open to primary fuel passage 66 in an end region 122 thereof. Outlet check 64 includes a check tip 110 having a seating surface 112 in contact with a check seat 116 of injector housing 44 at the closed position of outlet check 64, as depicted in FIG. 3. End region 122 is adjacent to check seat 116. Transfer passages 118 may thus include always-open transfer passages located outside of seating surface 112 and exposed to a fluid pressure of primary fuel passage 64. A sac 128 is formed between injector housing 44 and check tip 110. Also in the illustrated embodiment, outlet check 64 includes one or more opening hydraulic surfaces 120 that enable outlet check 64 to open in response to a fluid pressure in primary fuel passage 66, in opposition to a closing bias of a biasing spring 130. Transfer passages 118 are located axially between opening hydraulic surfaces 120 and seating surface 112 in the illustrated embodiment.

Figure 4:
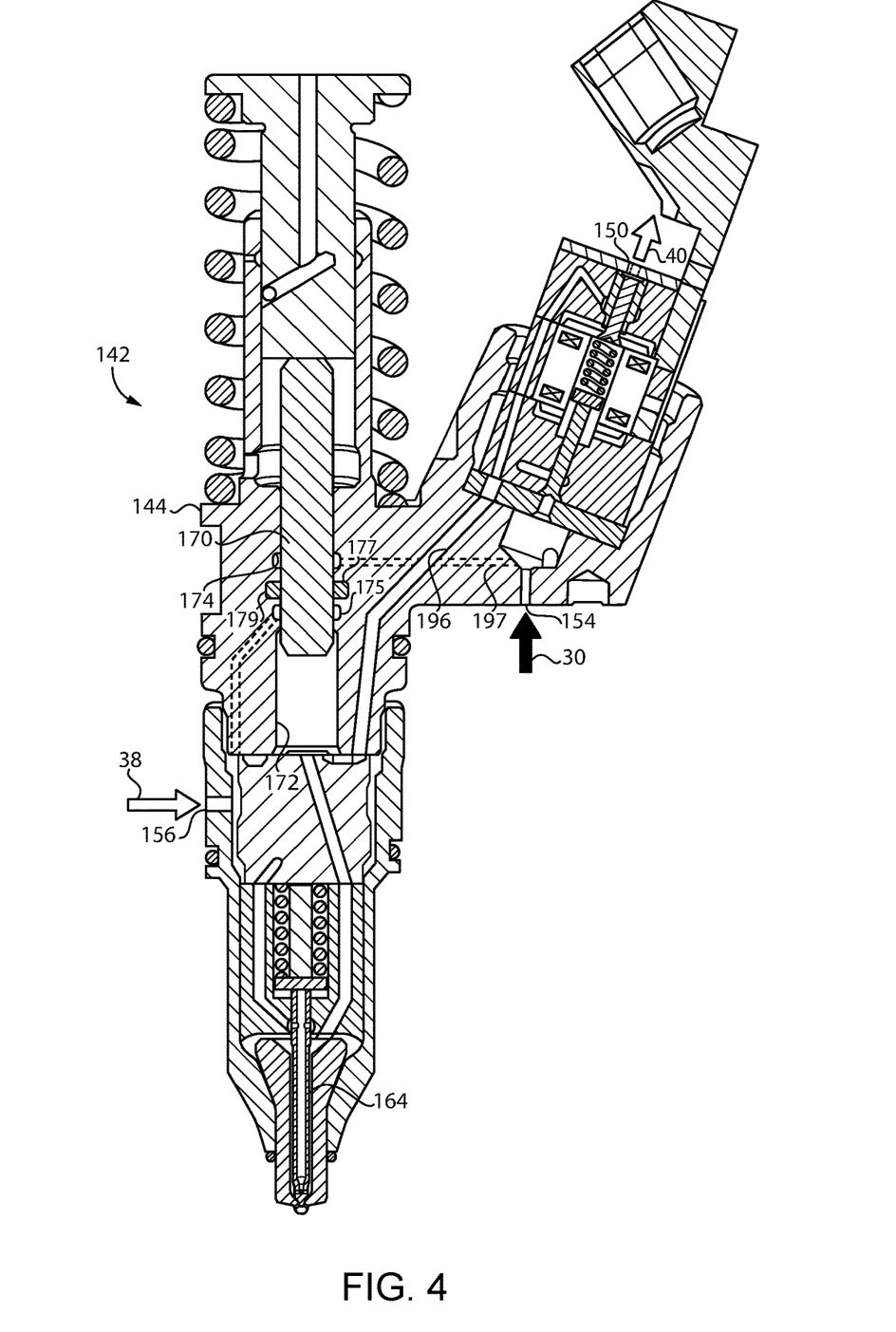
FIG. 4 is a sectioned side diagrammatic view of a dual fuel injector, according to another embodiment.

Referring now to FIG. 4, there is shown a dual fuel injector 142 according to another embodiment. Dual fuel injector 142 may be structured in many ways similarly or identically to dual fuel injector 42 discussed above, and the foregoing description of dual fuel injector 42 should be understood to refer to dual fuel injector 142 except where otherwise indicated. Dual fuel injector 142 includes an injector housing 144 having formed therein a pilot fuel inlet 154 and a primary fuel inlet 156, and defines a low pressure space 150. Dual fuel injector 142 may be fluidly connected by way of primary fuel inlet 156 and pilot fuel inlet 154 to a primary fuel feed line 38 and a pilot fuel feed line 30, respectively, and to a return line 40, structured similarly or identically in a dual fuel system as in the foregoing embodiments. Dual fuel injector 142 further includes a plunger 170 movable in injector housing 144 increase a pressure of primary fuel in a plunger cavity 172 for injection. Dual fuel injector 142 further includes an outlet check 164 again structured similarly or identically to outlet check 64 as in other embodiments described herein. A primary fuel passage or spill passage is shown at 196 and a pilot fuel passage is shown at 197.

Dual fuel injector 142 also includes a first fuel seal annulus 174 formed in injector housing 144. Fuel seal annulus 174 extends circumferentially around plunger 170 and is fluidly connected to pilot fuel inlet 154. Dual fuel injector 142 also includes a second fuel seal annulus 175 formed in injector housing 144. Second fuel seal annulus 175 extends circumferentially around plunger 170 and fluidly connects to primary fuel inlet 156 by way of passages or clearances in injector housing 144. Dual fuel injector 142 may further include a non-metallic seal 177, such as an annular elastomeric or fluoropolymer seal element, positioned within a groove 179 formed in injector housing 144, for example, and extending circumferentially around plunger 170. Non-metallic seal 177 is positioned to limit fuel leakage between first fuel seal annulus 174 and second fuel seal annulus 175.

It will be recalled that pilot fuel is typically provided to a dual fuel injector at a supply pressure that is higher than a supply pressure of the primary fuel. During fuel pressurization for injection, however, the primary fuel pressure inside a dual fuel injector, including any of the dual fuel injector embodiments herein, will be increased substantially above the supply pressure of the pilot fuel. In fuel injector 142 second fuel seal annulus 175 may contain primary fuel, and primary fuel leaked from plunger cavity 172 during fuel pressurization can migrate up through a clearance between plunger 170 and injector body 144 and into second fuel seal annulus 175. Any primary fuel that migrates from second fuel seal annulus 175 through a clearance between plunger 170 and fuel injector 144, upward in the illustration of FIG. 4, can be limited from further migration by way of non-metallic seal 177. Further, any primary fuel that manages to leak past non-metallic seal 177 can enter first fuel seal annulus 174 and make its way to a central passage in outlet check 164, for example, and be injected, or could otherwise simply be permitted to mix with pilot fuel if such mixing is considered tolerable.

The presently described configuration can assist in ensuring that no primary fuel, such as an alcohol fuel as described herein, leaks all the way past plunger 170, out of dual fuel injector 142, and eventually enters the engine oil system. Other variations and sealing strategies are contemplated herein to prevent mixing of primary fuel with engine oil in the engine oil system and/or limit the extent to which any primary fuel makes its way into primary fuel passages in a dual fuel injector, or vice versa. In one example further embodiment, two fuel seal annuluses, one fluidly connected to pilot fuel and the other fluidly connected to primary fuel, are employed and no non-metallic seal is used. Still other variations could include using only a non-metallic seal and/or coupling a non-metallic seal directly to a plunger such that the non-metallic seal reciprocates with the plunger in an injector housing.

INDUSTRIAL APPLICABILITY

Returning to the embodiment of FIGS. 1-3, but by analogy also in reference to the embodiment of FIG. 4, it will be recalled that a supply pressure of liquid pilot fuel in the present disclosure may be greater than a supply pressure of liquid primary fuel. When spill valve 78 is open and admission valve 80 is closed a fluid pressure inside fuel injector 42 may be substantially at the primary fuel supply pressure throughout. When spill valve 78 is closed, fluid pressure in dual fuel injector 42, of both pilot fuel and primary fuel, can be increased to an injection pressure that acts on opening hydraulic surface 120 to overcome a closing bias of biasing spring 130. In other embodiments outlet check 64 could be directly controlled with hydraulic pressure on a closing hydraulic surface of outlet check 64. Based upon the different supply pressures, the present disclosure exploits the opportunity between fuel injections, to admit pilot fuel into pilot fuel passage 68 and primary fuel passage 66 to displace some primary fuel from end region 122 and form the segmented fuel charge of leading pilot fuel and trailing primary fuel as described herein.

Another way to understand this capability is that since fluid pressures inside dual fuel injector 42 will only be increased to an injection pressure when spill valve 78 is closed, during other times pilot fuel can be rapidly admitted in a relatively small quantity to form the segmented fuel charge in anticipation of a following injection cycle. This strategy is considered to assist in limiting any mixing of pilot fuel and primary fuel that might otherwise occur. During operation of engine 12 and engine system 10 admission valve 80 can be actuated to admit a liquid pilot fuel into pilot fuel passage 68, with the admitted liquid pilot fuel displacing liquid primary fuel in primary fuel passage 66 to form the segmented fuel charge. A fuel injection will begin first with the pilot fuel, then transition to the primary fuel, and then end with the primary fuel.

After the formation of the segmented fuel charge, and with outlet check 64 still closed, a fluid pressure in primary fuel passage 66 can be increased to an injection pressure such as by closing spill valve 78 just prior to or during advancing plunger 70 advance in plunger cavity 72. When a sufficient fluid pressure in primary fuel passage 66 is reached, hydraulic pressure acting on opening hydraulic surface 120, including hydraulic pressure exerted by pilot fuel in end region 122, urges outlet check 64 open to begin injecting the segmented fuel charge into a combustion cylinder 16. The injected liquid pilot fuel of the segmented fuel charge can then compression-ignite in combustion cylinder 16, typically at or close to a top dead center position of an associated piston, and cause ignition and diffusion burning of the injected liquid primary fuel of the segmented fuel charge. As noted above, admitting liquid pilot fuel can include admitting liquid pilot fuel in an amount that is based upon an open time of electrically actuated admission valve 80. The admission of pilot fuel can typically occur any time during about one full cam rotation following a fuel injection, and can thus include admitting the pilot fuel to form a new segmented fuel charge after opening spill valve 78 to end an earlier injection of an earlier segmented fuel charge.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector nozzle assembly comprising:
a nozzle tip defining a longitudinal axis, and forming a check seat and a plurality of nozzle outlets;
a check tip including a seating surface and movable within the nozzle tip between a closed check position in contact with the check seat, and an open check position;
a first fuel passage formed between the nozzle tip and the check tip and open to the plurality of nozzle outlets at the open check position;
a second fuel passage formed in the check tip; and
a plurality of always-open transfer passages formed in the check tip and fluidly connecting the first fuel passage to the second fuel passage.

2. The fuel injector nozzle assembly of claim 1 wherein the plurality of always-open transfer passages have a circumferential distribution around the longitudinal axis.

3. The fuel injector nozzle assembly of claim 2 wherein the plurality of always-open transfer passages are located on radiuses of a circle defined by the longitudinal axis.

4. The fuel injector nozzle assembly of claim 1 wherein the check tip includes opening hydraulic surfaces.

5. The fuel injector nozzle assembly of claim 4 wherein the always-open transfer passages are located axially between the seating surface and the opening hydraulic surfaces.

6. The fuel injector nozzle assembly of claim 1 wherein a sac is formed between the check tip and the nozzle tip.

7. The fuel injector nozzle assembly of claim 1 further comprising a check including the check tip, and a fuel port is formed in the check and fluidly connected to the first fuel passage.

8. The fuel injector nozzle assembly of claim 1 wherein the fuel port includes a radially extending fuel port.

9. The fuel injector nozzle assembly of claim 7 wherein a full axial length of the second fuel passage is greater than a full axial length of the first fuel passage.

10. The fuel injector nozzle assembly of claim 1 wherein the check tip includes a taper narrowing in an axially outward direction to a terminal end.

\* \* \* \* \*